(12) United States Patent
Takahashi et al.

(10) Patent No.: US 9,513,533 B2
(45) Date of Patent: Dec. 6, 2016

(54) FOCAL PLANE SHUTTER AND OPTICAL APPARATUS PROVIDED WITH SAME

(71) Applicant: SEIKO PRECISION INC., Narashino-shi (JP)

(72) Inventors: Hiroshi Takahashi, Narashino (JP); Minori Murata, Narashino (JP); Seiichi Oishi, Narashino (JP); Mitsuru Suzuki, Narashino (JP); Shoichi Tokura, Narashino (JP)

(73) Assignee: SEIKO PRECISION INC., Narashino-shi (JP)

( * ) Notice: Subject to any disclaimer, the term of this patent is extended or adjusted under 35 U.S.C. 154(b) by 96 days.

(21) Appl. No.: 14/277,322

(22) Filed: May 14, 2014

(65) Prior Publication Data

US 2014/0248046 A1 Sep. 4, 2014

Related U.S. Application Data

(63) Continuation of application No. PCT/JP2012/076588, filed on Oct. 15, 2012.

(30) Foreign Application Priority Data

Dec. 16, 2011 (JP) .................................. 2011-276020
Sep. 24, 2012 (JP) .................................. 2012-210058

(51) Int. Cl.
G03B 9/40 (2006.01)
G03B 9/36 (2006.01)
G03B 9/42 (2006.01)

(52) U.S. Cl.
CPC . G03B 9/40 (2013.01); G03B 9/36 (2013.01); G03B 9/42 (2013.01)

(58) Field of Classification Search
CPC ................ G03B 9/40; G03B 9/36; G03B 9/42
(Continued)

(56) References Cited

U.S. PATENT DOCUMENTS 4,643,553 A * 2/1987 Fujino ........................... 396/469
6,726,379 B2 * 4/2004 Watabe ..................... G03B 9/08
396/456

(Continued)

FOREIGN PATENT DOCUMENTS

CN 1839343 A 9/2006
CN 2081276 A 6/2011
(Continued)

OTHER PUBLICATIONS

Japanese Office Action dated Nov. 4, 2014 in the corresponding Japanese patent application No. 2012-210058, with English translation.
(Continued)

Primary Examiner — Rochelle-Ann J Blackman
(74) Attorney, Agent, or Firm — Kratz, Quintos & Hanson, LLP (57) ABSTRACT

A focal plane shutter includes: a board including an opening; a leading blade and a trailing blade opening and closing the opening; a trailing blade actuator driving the trailing blade; a drive member driving the trailing blade by receiving driving force of the trailing blade actuator; and a buffering member abutting with the drive member in a state where the trailing blade recedes away from the opening, wherein the trailing blade actuator causes the drive member to move away from the buffering member from an abutting state therewith and to abut therewith again in a charging operation, and then starts an exposure operation.

20 Claims, 9 Drawing Sheets (58) Field of Classification Search
USPC .................................................. 396/456, 457
See application file for complete search history.

(56) References Cited

U.S. PATENT DOCUMENTS

| | | |
|---|---|---|
| 2003/0012573 A1 | 1/2003 | Sekizawa |
| 2006/0127085 A1 | 6/2006 | Matsuki et al. |
| 2008/0279544 A1 | 11/2008 | Westerweck |
| 2008/0279545 A1 | 11/2008 | Westerweck |
| 2011/0052183 A1 | 3/2011 | Westerweck |

FOREIGN PATENT DOCUMENTS

| | | |
|---|---|---|
| JP | 2005-70454 A1 | 3/2005 |
| JP | 2006-106624 A1 | 4/2006 |
| JP | 2008-145651 A1 | 6/2008 |
| WO | WO02/43227 A1 | 5/2002 |

OTHER PUBLICATIONS

Chinese Office Action of counterpart Chinese Application No. 201280062182.4, issued Jun. 30, 2016, with translation.
International Search Report for International Application No. PCT/JP2012/076588 dated Jan. 15, 2013.

\* cited by examiner

FOCAL PLANE SHUTTER AND OPTICAL APPARATUS PROVIDED WITH SAME

CROSS-REFERENCE TO RELATED APPLICATION

This application is a continuation of and claims priority to International Patent Application No. PCT/JP2012/076588 filed on Oct. 15, 2012, which claims priority to Japanese Patent Application Nos. 2011-276020 filed on Dec. 16, 2011, and 2012-210058 filed on Sep. 24, 2012, subject matter of these patent documents is incorporated by reference herein in its entirety.

BACKGROUND (i) Technical Field

The present invention relates to focal plane shutters and optical apparatuses provided with the same.

(ii) Related Art

There is known a focal plane shutter: including a board including an opening; a leading blade and a trailing blade opening and closing the opening; an actuator driving the trailing blade; and a drive member driving the trailing blade by receiving driving force of the actuator. Such a focal plane shutter is disclosed in Japanese Unexamined Patent Application Publication (Translation of PCT Application) No. 2002-043227.

The drive member that drives the trailing blade is swingably provided in the board. Further, the drive member is provided with a drive pin. The drive member swings such that the drive pin moves within an escape slot formed in the beard. This restricts the swinging range of the drive member. There is a case where a buffering member is provided at an end portion of the escape slot in order to absorb the impact when the drive pin abuts with the end portion of the escape slot. In this case, the following problem may occur.

In a charging operation before an exposure operation, the leading blade move to close the opening while the trailing blade is maintained away from the opening. In the state where the trailing blade is positioned away from the opening, the drive member that drives the trailing blade is maintained in abutment with the buffering member. In a case where the drive member is maintained in abutment with the buffering member for a predetermined period, the drive member might press the buffering member and a stop position of the drive member might be positionally displaced from the desired position. In this case, the rotational range of the drive member in the exposure operation is increased, and the moving distance of the trailing blade is increased. In this case, the exposure period might be longer than the desired period.

Further, when the drive member is maintained in abutment with the buffering member, the buffering member and the drive member might adhere to each other with weak force. In this case, in the exposure operation, the timing when the drive member moves out of contact with the buffering member might be delayed from the desired timing. In this case, the exposure period might also be longer than the desired period. In such as way, the exposure period might be varied.

Furthermore, in a case where the buffering member is not provided at the end portion of the escape slot, the following problem may occur. In the state where the trailing blade is positioned away from the opening before the exposure operation, the drive member that drives the trailing blade is maintained in abutment with the and portion of the escape slot as a portion of the board. When this state is maintained the drive member and the end portion of the escape slot might adhere to each other with weak force. In this case, the timing when the drive member moves out of contact with the end portion of the escape slot might also be delayed from the desired timing, and the exposure period might also be longer than the desired period. In such a way, the exposure period might be varied.

The above problem might occur, in a case where a focal plane shutter where the leading blade closes the opening and trailing blade moves away from the opening in an initial state before pushing a release button and the exposure operation is performed by pushing the release button.

SUMMARY

It is thus object of the present invention to provide a focal plane shutter suppressing a variation in an exposure period, and an optical apparatus provided with the same.

According to an aspect of the present invention, there is provided a focal plane shutter including: a board including an opening; to leading blade and a trailing blade opening and closing the opening; a trailing blade actuator driving the trailing blade; a drive member driving the trailing blade by receiving driving force of the trailing blade actuator; and a buffering member abutting with the drive member in a state where the trailing blade recedes away from the opening, wherein the trailing blade actuator causes the drive member to move away from the buffering member from an abutting state therewith and to abet therewith again in a charging operation, and then starts an exposure operation.

DETAILED DESCRIPTION

In the following, plural embodiments will be described.

First Embodiment

Figure 1A:
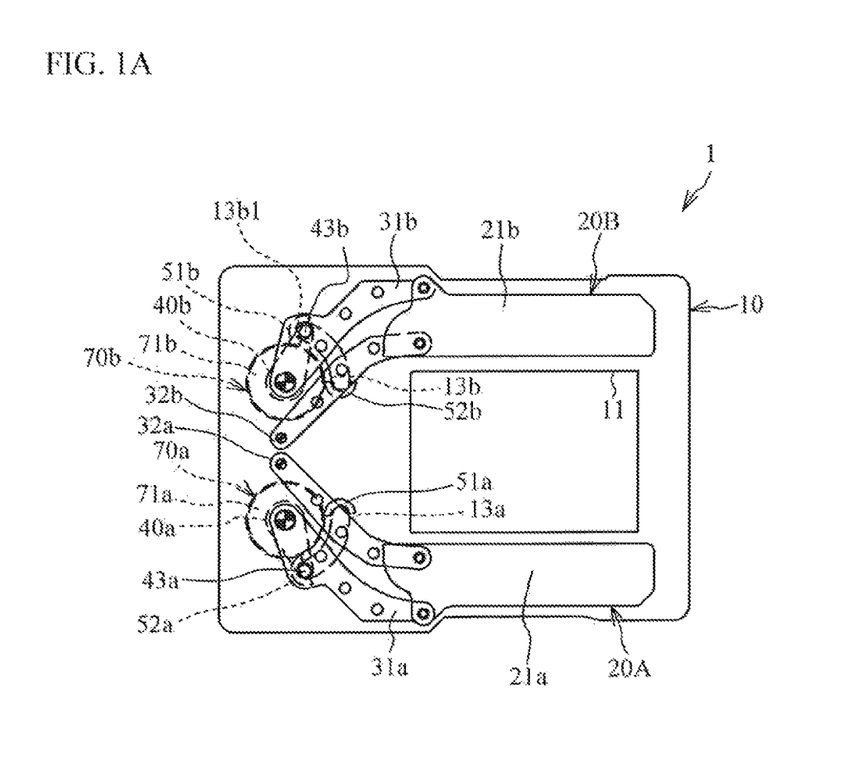
FIG. 1A is a front view of a focal plane shutter according to the present embodiment.

In the following, the embodiment will be described with reference to drawings. FIG. 1A is a front view of a focal plane shutter 1 according to the present embodiment. The focal plane shutter 1 includes: a board 10 including an opening 11; a leading blade 20A and a trailing blade 20B opening and closing the opening 11; an arm 31a and an assist arm 32a for driving the leading blade 20A; and an arm 31b and an assist arm 32b for driving the trailing blade 20B.

The board 10 is made of a synthetic resin, and includes the opening 11 having a rectangular shape. Although the leading blade 20A and the trailing blade 20B each include plural blades, blades 21a and 21b are only illustrated and other blades are omitted in FIG. 1A. Each of the blades 21a and 21b is made of a synthetic resin, and is formed into a thin shape. Further, each of the arms 31a and 31b and assist arms 32a and 32b is made of a synthetic resin and has a thin plate shape. These arms are swingably supported by the board 10.

The focal plane shutter 1 includes a leading blade actuator 70a (hereinafter, referred to as actuator) and a trailing blade actuator 70b (hereinafter, referred to as actuator) as respective drive sources driving the leading blade 20A and the trailing blade 20B. The actuators 70a and 70b respectively include rotors 71a and 71b that are rotatable within a predetermined range in both directions. Each of the rotors 71a and 71b is a permanent magnet magnetized to have plural magnetic poles in the circumferential direction. The actuator 70a includes a non-illustrative stator and a non illustrative coil wound therearound, beside the rotor 71a. The energization of the coil excites the stator, so the rotor 71a is rotated by the magnetic attractive force and repulsive force exerted between the stator and the rotor 71a. Likewise, the actuator 70b has the same arrangement. The rotors 71a and 71b are respectively secured with a leading blade drive lever (hereinafter referred to as a drive lever) 40a and a trailing blade drive lever (hereinafter referred to as a drive lever) 40b serving as drive members.

The rotation of the rotor 71a causes the drive lever 40a to swing within a predetermined range. The drive lever 40a is formed with a drive pin 43a at its end. The drive pin 43a is fitted into a fitting hole of the arm 31a. Further, the board 10 is formed with an escape slot 13a releasing the drive pin 43a and having an arc shape. The abutment of the drive pin 43a with an end portion of the escape slot 13a restricts the swingable range of the drive lever 40a.

One end and the other end of the escape slot 13a are respectively provided with buffering members 51a and 52a. The drive pin 43a of the drive lever 40a abuts with the buffering member 51a or 52a, thereby suppressing the drive lever 40a from bounding. In the state where the leading blade 20A recedes away from the opening 11, the drive pin 43a of the drive lever 40a abuts with the buffering member 52a. In the state where the leading blade 20A closes the opening 11, the drive pin 43a of the drive lever 40a abuts with the buffering member 51a.

Figure 1B:
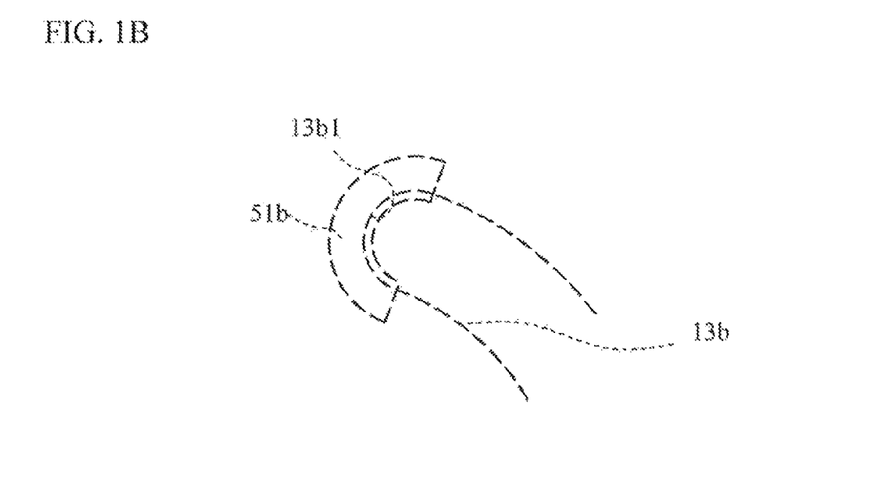
FIG. 1B is an enlarged view around one end of an escape slot.

Likewise, the drive lever 40b includes a drive pin 43b fitting into a fitting hole of the arm 31b. One end 13b1 and the other end of an escape slot 13b are respectively provided with buffering members 51b and 52b. FIG. 1B is an enlarged view around the one end 13b1 of the escape slot 13b. Additionally, the drive lever 40b is omitted in FIG. 1B. In the state where the trailing blade 20B recedes from the opening 11, the drive pin 43b of the drive lever 40b abuts with the buffering member 51b. In the state where the trailing blade 20B closes the opening 11, the drive pin 43b of the drive lever 40b abuts with the buffering member 52b. The buffering members 51a, 52a, 51b, and 52b are each made of rubber in the present embodiment. However, these members may be made of another material such as silicon having elasticity.

For example, in continuous shooting, the drive levers 40a and 40b reciprocate within a predetermined range in a short period. For this reason, both ends of the escape slots 13a and 13b are respectively provided with such buffering members, so the impact of the drive levers 40a and 40b can be absorbed.

With the above configuration, the rotation of the rotor 71a causes the drive lever 40a to swing, thereby enabling the arm 31a to swing. Therefore, the leading blade 20A moves to open or close the opening 11. Likewise, the rotation of the rotor 71b causes the drive lever 40b to swing, thereby enabling the arm 31b to swing. Therefore, the trailing blade 20B moves to open or close the opening 11.

Figure 2:
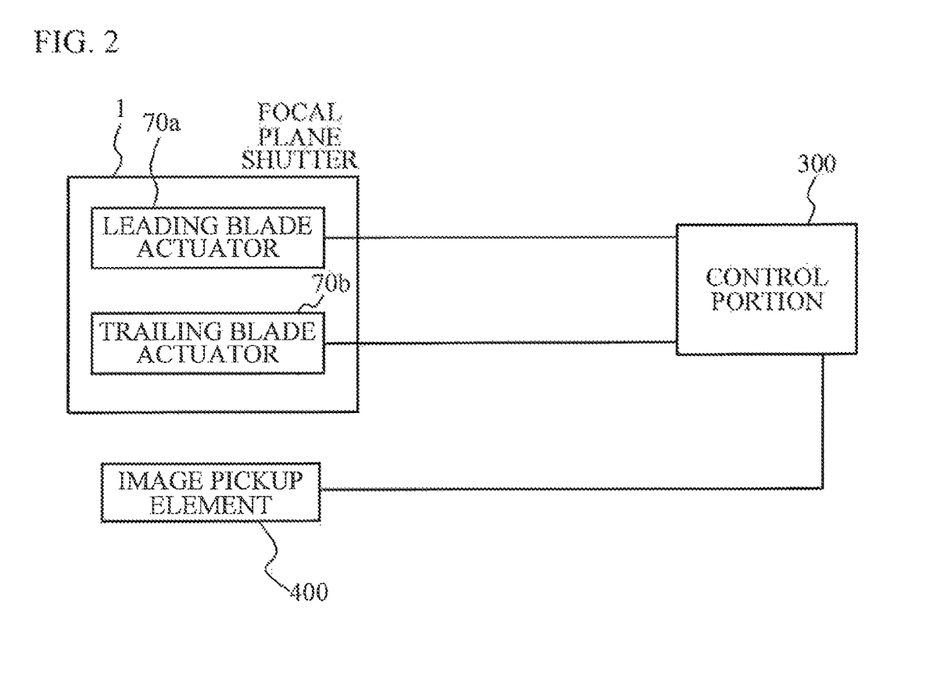
FIG. 2 is a block diagram of a camera including the focal plane shutter.

A description will be given of a configuration of a camera equipped with the focal plane shutter 1 FIG. 2 is a block diagram of the camera equipped with the focal plane shutter 1. The camera includes the focal plane shutter 1; a control portion 300; and an image pickup element 400. The control portion 300 controls an operation of the whole camera and includes a CPU, a ROM, and a RAM. Additionally, the camera includes lenses, not illustrated in FIG. 2, for adjusting a focal length.

The control portion 300 controls energization states of the coils of the actuators 70a and 70b. The image pickup element 400 changes an object image formed by the light passing through the opening 11 into electric signals. The image pickup element 400 is, for example, a CCD or a CMOS.

Additionally, there is not provided a set member for respectively positioning the leading blade 20A and the trailing blade 20B at charging positions. This is because the leading blade 20A and the trailing blade 20B can be positioned at the charging positions by the rotors 71a and 71b that are rotatable in both directions.

Figure 3:
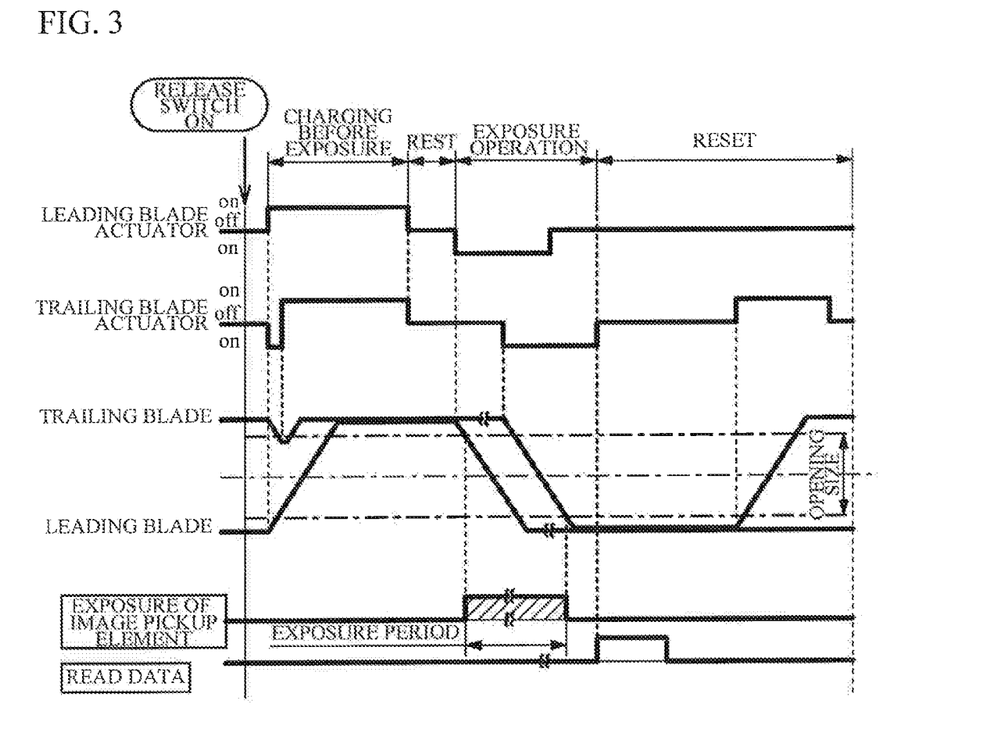
FIG. 3 is a timing chart of the focal plane shutter.

Next, a description will be given of the one of the focal plane shutter 1. FIG. 3 is a timing chart of the focal plane shutter 1. FIG. 1A illustrates an initial state of the focal plane shutter 1. In the initial state, as illustrated in FIG. 1A, the leading blade 20A and the trailing blade 20B recedes away from the opening 11.

Figure 4:
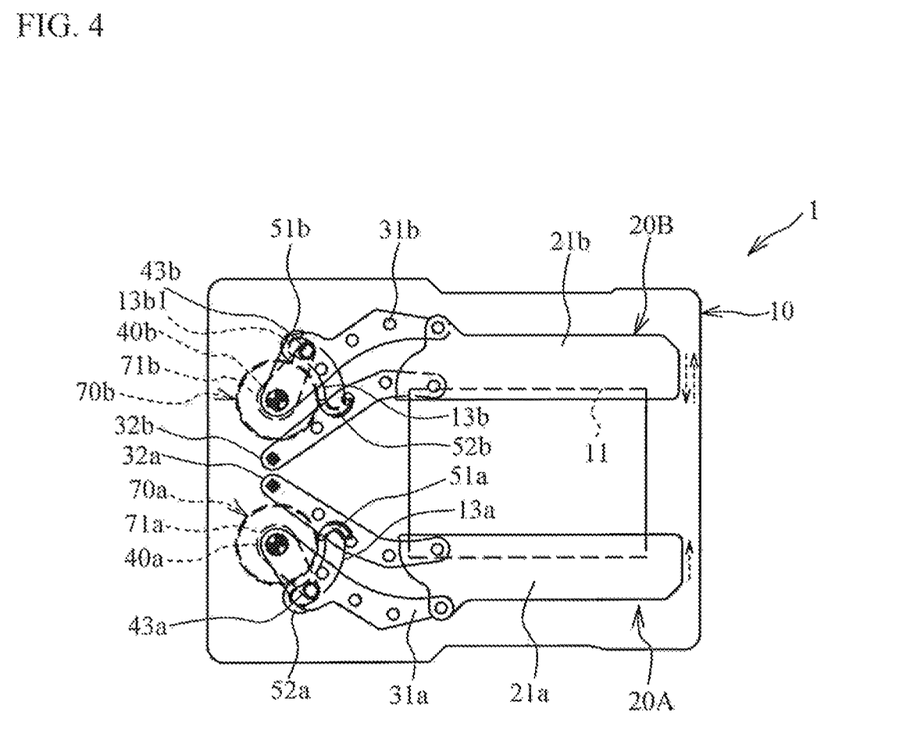
FIG. 4 illustrates a state where charging operation starts and both a leading blade and a trailing blade are moving toward an opening.

A release button of the camera is pushed to start a charging operation. When the charging operation starts, the coil of the actuator 70a is energized, so the leading blade 20A moves to close the opening 11. Further, the coil of the actuator 70b is energized so as to temporally move the trailing blade 20B toward the opening 11. After that, the current direction in the coil of the actuator 70b is changed before the trailing blade 20B fully closes the opening 11, so that the trailing blade 20B moves away from the opening 11. FIG. 4 illustrates the state where the charging operation starts and both the leading blade 20A and the trailing blade 20B are moving toward the opening 11.

Figure 5:
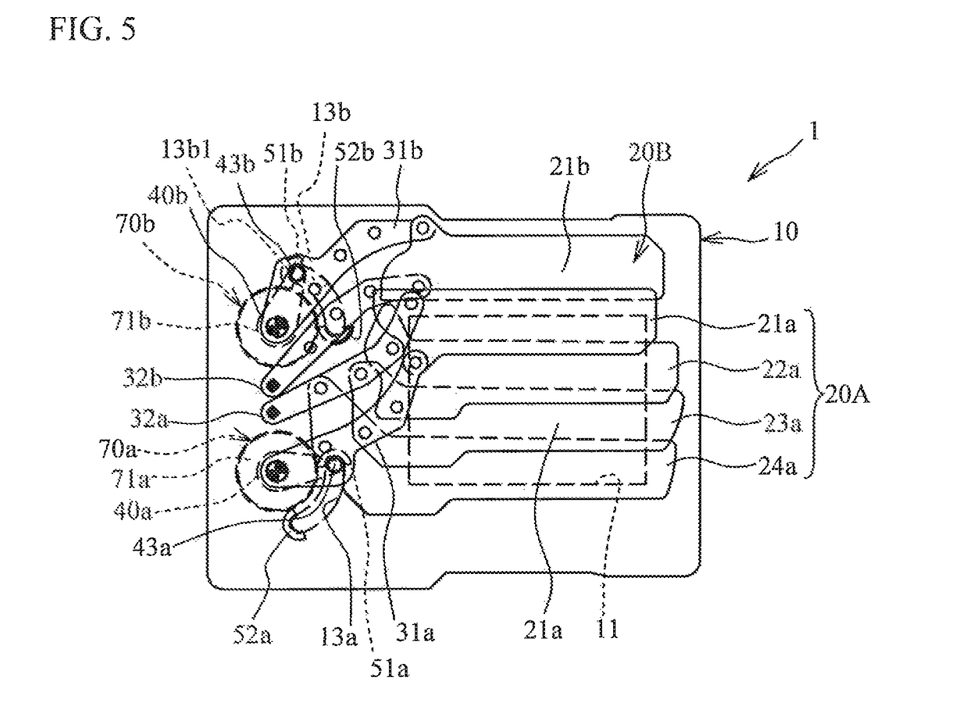
FIG. 5 illustrates the focal plane shutter in a state where the charging operation is finished.

After that, the energization of the coils of the actuators 70a and 70b is stopped in the state where the leading blade 20A closes the opening 11 and the trailing blade 20B are positioned away from the opening 11. In such a way, the charging operation is finished. FIG. 5 illustrates the focal plane shutter 1 in the state where the charging operation is finished. In addition, the blades 21a to 24a of the leading blade 20A are illustrated in FIG. 5.

When a predetermined rest period elapses after the charging operation, an exposure operation starts. When the exposure operation starts, the coil of the actuator 70a is energized, and the leading blade 20A moves to open the opening 11. After a predetermined period elapses from the time when the coil of the actuator 70a is energized, the coil of the actuator 70b is energized, so the trailing blade 20B moves to close the opening 11. When the leading blade 20A moves fully away from the opening 11 and the trailing blade 20B fully closes the opening 11, the energization of the coils of the actuators 70a and 70b are stopped. In such a way, the exposure operation is finished. A period from the time when the leading blade 20A starts moving to open the opening 11 to the time when the trailing blade 20B fully closes the opening 11 is referred to as an exposure period.

After the exposure operation is finished, the data are read by the RAM of the control portion 300 or memory of the camera side. Next, the coil of the actuator 70b is energized, and the trailing blade 20B moves away from the opening 11. Thus, the state returns to the initial state illustrated in FIG. 1A.

Herein, the actuator 70b is energized to temporally move the trailing blade 20B toward the opening 11 in the charging operation. If such operation of the trailing blade 20B in accordance with the present invention is not performed, it is seen from the timing chart of FIG. 3 that the trailing blade 20B only performs the exposure operation for fully closing the opening 11 and finishing taking a picture after the release button is pushed. Further, in a normally open type focal plane shutter where the opening 11 is fully opened after the camera is turned on, it is supposed that the first operation of the trailing blade 20B after the camera is turned on is the exposure operation for fully closing the opening 11 and finishing taking a picture. Thus, regardless of the frequency of turning on the camera, that is, even in a case where the camera is not turned on for a predetermined period, it is preferable that the exposure operation of the trailing blade 20B is stable. This is because the variation in the exposure operation of the trailing blade 20B directly leads to the variation in the exposure period and causes the variation in image quality.

In a case where the camera is not turned on for a predetermined period, in the focal plane shutter 1 according to the present invention, the drive pin 43b of the drive lever 40b is maintained in abutment with the buffering member 51b for a predetermined period. As mentioned above, in the charging operation after the release button is pushed, as illustrated in FIG. 4, the coil of the actuator 70b is energized such that the trailing blade 20B moves toward the opening 11, and is energized in the opposite direction afterward. Therefore, in the charging operation, the drive pin 43b of the drive lever 40b temporally moves away from the buffering member 51b, and then abuts therewith again.

Herein, a description will be given of a problem that might occur when the drive pin 43b of the drive lever 40b is maintained in abutment with the buffering member 51b for a certain period. In this case, the drive pin 43b might press the buffering member 51b, so the stop position of the drive lever 40b might be positionally displaced from the desired position. In this case, the rotational range of the drive lever 40b increases, so the movable range of the trailing blade 20B increases. When this problem occurs in the exposure operation, the exposure period might be longer than the desired exposure period.

Also, the drive pin 43b and the buffering member 51b might adhere to each other with weak force. For example, in a case where the buffering member 51b is a rubber in the present embodiment, the drive pin 43b and the buffering member 51b might adhere to each other by oil from the rubber or lubricating oil ingredients containing minute impurities such as dust in the focal plane shutter. In this case, the drive lever 40b has to move away from the buffering member 51b against the adhesive force therebetween so as to drive the trailing blade 20B. For this reason, the timing when the drive pin 43b of the drive lever 40b moves away from the buffering member 51b might be delayed relative to the desired timing. Likewise, when this problem occurs in the exposure operation, the exposure period might be longer than the desired period. In the above way, an exposure period might be varied.

In the present embodiment, in the charging operation, the drive pin 43b of the drive lever 40b is temporally moved away from the buffering member 51b from the state where the drive pin 43b abuts therewith, and then the drive pin 43b abuts therewith again. For example, in a case where the buffering member 51b is largely deformed by being pushed by the drive pin 43b, conceivably, the drive pin 43b of the drive lever 40b is moved away from the buffering member 51b once, whereby the buffering member 51b is restored to the original shape by its elastic restoring force while the drive pin 43b is away from the buffering member 51b. Therefore, the drive pin 43b abuts the buffering member 51b after the buffering member 51b is restored to the original shape once, whereby the drive lever 40b can be set at the desired stop position.

Also, in a case where the drive pin 43b and the buffering member 51b adhere to each other with weak force, the drive pin 43b is moved away from the buffering member 51b once, which can suppress the adherence. This can prevent the timing when the drive pin 43b starts moving away from the buffering member 51b from being retarded, in the exposure operation after the charging operation. Accordingly, a variation in the exposure period can be suppressed. This can suppress a variation in the image quality.

Additionally, in the charging operation, after the control portion 300 energizes the coil of the actuator 70b in the predetermined direction and the drive pin 43b is moved away from the buffering member 51b, the control portion 300 energizes the coil in the opposite direction. The coil of the actuator 70b is energized in the opposite direction, so that the drive pin 43b abuts with the buffering member 51b again immediately, whereby the drive lever 40b abuts therewith in the stable manner.

The control portion 300 may not energize the coil of the actuator 70b in the opposite direction. For example, in the charging operation, after the drive pin 43b is moved away from the buffering member 51b by energizing the coil of the actuator 70b in the predetermined direction, the energization may be stopped without energizing the coil of the actuator 70b in the opposite direction. In this case, the energization period of the actuator 70b is set, such that the rotor 71b is rotated reversely by its detent torque and the drive pin 43b abuts with the buffering member 51b again after the energization of the coil of the actuator 70b is stopped. This can reduce the power consumption.

Figure 6:
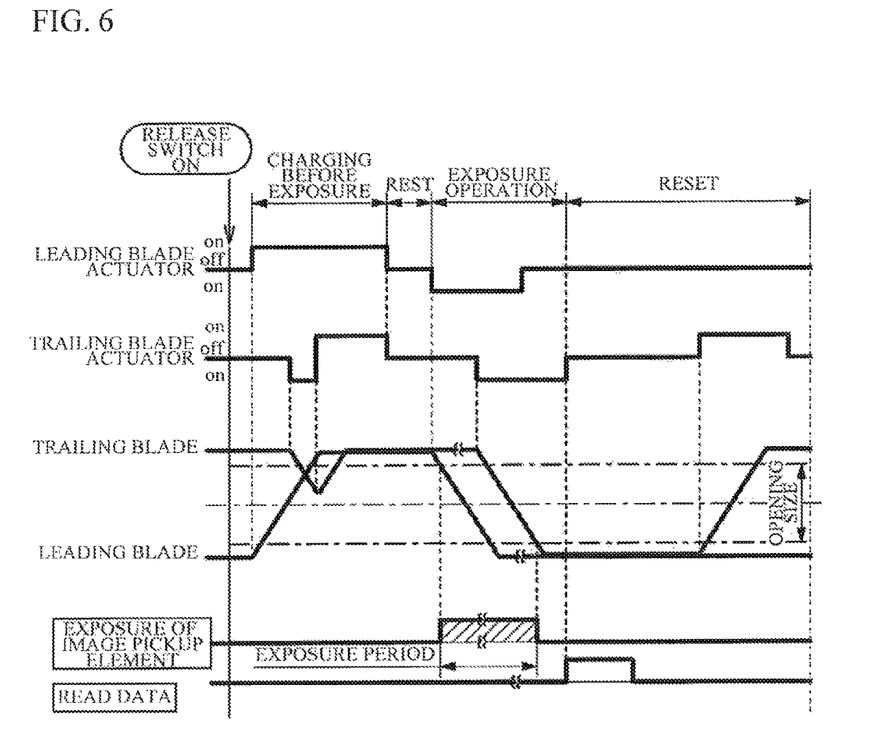
FIG. 6 is a variation of a timing chart of the focal plane shutter.

FIG. 6 is a timing chart of a variation of the focal plane shutter 1. As illustrated in FIG. 6, in the charging operation, the energization of the coil of the actuator 70b may be started after the energization of the coil of the actuator 70a is started. In such a way, the timing when the energization of the coil of the actuator 70a is started is made different from the timing when the energization of the coil of the actuator 70b is started, which can reduce the load on the control portion 300 controlling the energization of both the coils, as compared with a case where both the coils are energized simultaneously.

The coil of the actuator 70b has only to be energized in the charging operation before the exposure operation or the pause period. The pause period is provided for stabilizing the positions of the drive levers 40a and 40b.

The above has described the case where the drive pin 43b of the drive lever 40b is maintained in abutment with the buffering member 51b for a certain period, but the buffering member 51b may not be provided. In other words, the focal plane shutter according to the present invention has the same effect, even if the drive pin 43b of the drive lever 40b abuts with the one end 13b1 of the escape slot 13b as a part of the board 10 in the state where the trailing blade 20B recedes from the opening 11.

In a case where the drive pin 43b of the drive lever 40b is maintained in abutment with the one end 13b1 of the escape slot 13b formed at the part of the board 10 for a certain period, the drive pin 43b and the one end 13b1 of the escape slot 13b might adhere to each other with weak force. This is conceivably because the drive pin 43b and the one end 13b1 of the escapes slot 13b might adhere so each other by lubricating oil ingredients containing minute impurities such as dust in the focal plane shutter. In this case, the drive lever 40b has to move away from the one end 13b1 of the escape slot 13b against the adhesive force therebetween so as to drive the trailing blade 20B. In particular, in a case where the drive pin 43b is maintained in abutment with the one end 13b1 of the escape slot 13b for a long term, the timing when the drive pin 43b of the drive lever 40b moves away from the one end 13b1 of the escape slot 13b might be delayed relative to the desired timing. When this problem occurs in the exposure operation, the exposure period might be longer than the desired period.

Like the case of employing the buffering member 51b, in the present embodiment, in the charging operation, the drive pin 43b of the drive lever 40b is temporally moved away from the one end 13b1 of the escape slot 13b from the state where the drive pin 43b abuts therewith, and then the drive pin 43b abuts therewith again. Thus, the drive pin 43b is moved away from the one end 13b1 of the escape slot 13b once, thereby suppressing the adherence. In the exposure operation after the charging operation, the timing when the drive pin 43b is moved away from the one end 13b1 of the escape slot 13b can be prevented from being delayed, suppressing the variation in the exposure period. It is therefore possible to suppress the variation in the image quality.

Also, in the charging operation, after the control portion 300 energizes the coil of the actuator 70b in the predetermined direction and the drive pin 43b is moved away from the one end 13b1 of the escape slot 13b, the control portion 300 energizes the coil in the opposite direction. The coil of the actuator 70b is energized in the opposite direction, so that the drive pin 43b abuts with the one end 13b1 of the escape slot 13b again immediately, and the drive lever 40b can abut therewith in the stable manner.

Also, the control portion 300 may not energize the coil of the actuator 70b in the opposite direction. For example, in the charging operation, after the drive pin 43b is moved away from the one end 13b1 of the escape slot 13b by energizing the coil of the actuator 70b in the predetermined direction, the energization of the actuator 70b may be stopped, so that the rotor 71b is rotated reversely by its detent torque and the drive pin 43b abuts with the one end 13b1 of the escape slot 13b again. This can reduce the power consumption.

Second Embodiment

Figure 7:
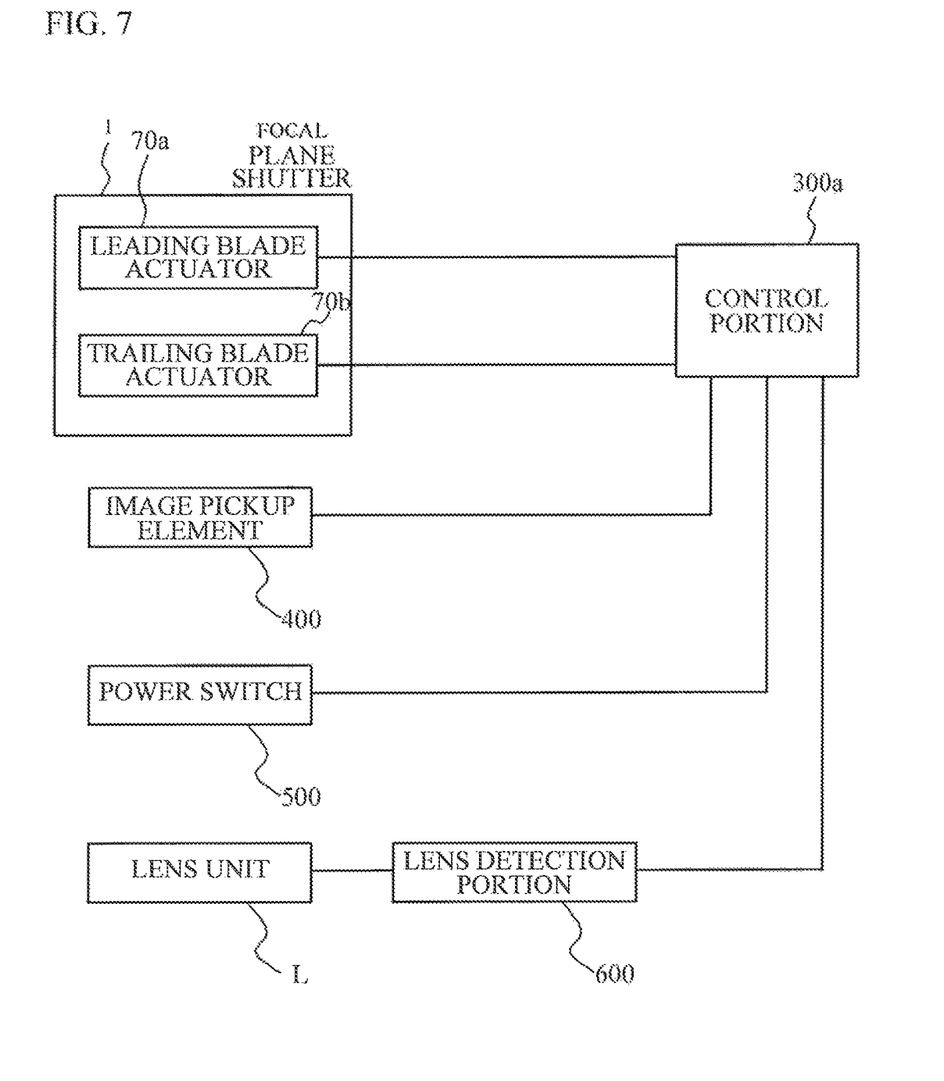
FIG. 7 is a block diagram of a camera including a focal plane shutter according to the second embodiment.

Next, the focal plane shutter 1 according to the second embodiment will be described below. Additionally, the components similar to those components according to the first embodiment are designated by the same reference numerals, and a duplicate description will be omitted. FIG. 7 is a block diagram of a camera including the focal plane shutter according to the second embodiment. This camera includes: a power switch 500 for turning on the camera; a lens detection portion 600 for detecting that a lens unit L installed in the camera is attached and detached. A control portion 300a can detect that the power switch 500 is pushed.

The lens detection portion 600 is mounted on a lens mount portion in the camera. The lens detection portion 600 includes a switch pushed by the lens unit installed in the lens mount portion, and outputs information on whether or not the switch is pushed to the control portion 300a. Moreover, the switch of the lens detection portion 600 may serve as a lens detachment button that is pushed for detachment of the lens unit L from a camera body. The lens detection portion 600 is always active during turning on the camera.

Figure 9:
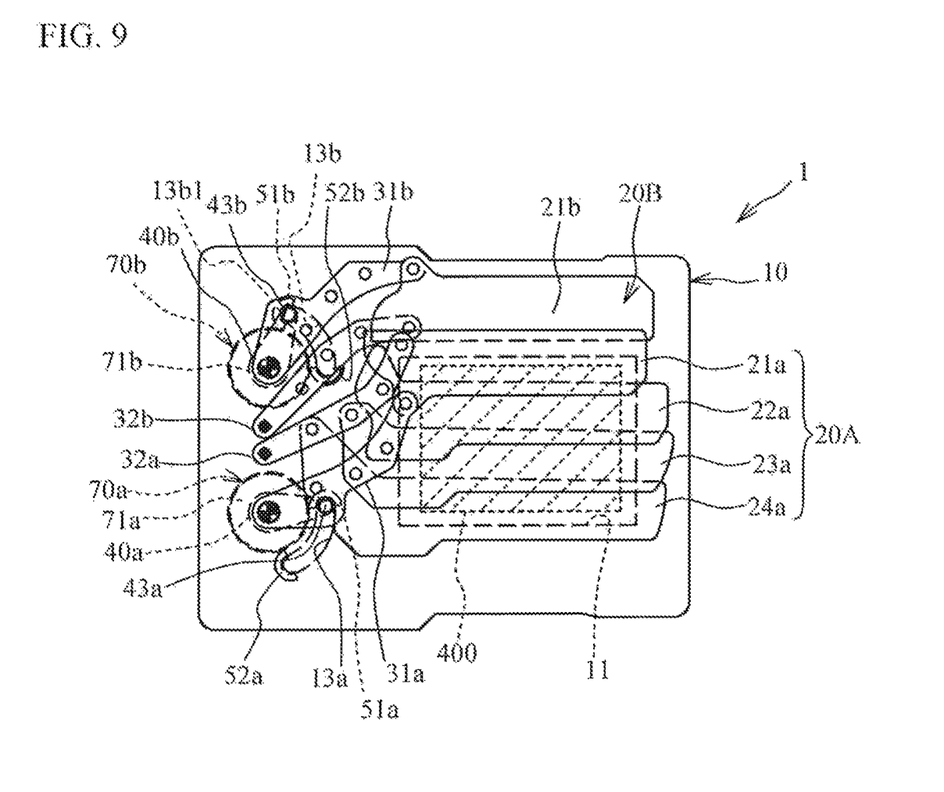
FIG. 9 is a view of an image pickup element on the front view of the focal plane shutter according to the second embodiment in the initial state.

FIG. 6 is a timing chart of the focal plane shutter 1 according to the second embodiment. As for the focal plane shutter 1 according to the second embodiment, in the initial state, the leading blade 20A closes the opening 11, and the trailing blade 20B recedes from the opening 11. That is, the focal plane shutter 1 according to the second embodiment is a normally closed type where the opening 11 is closed after turning on the camera. FIG. 9 is a front view of the focal plane shutter 1 according to the second embodiment in the initial state.

When the release switch of the camera is pushed, the coil of the actuator 70b is energized to move the trailing blade 20B toward the opening 11, and then the coil is energized in the opposite direction. Therefore, before the exposure operation, the drive pin 43b of the drive lever 40b temporally moves away from the buffering member 51b, and then abuts therewith again. Likewise, after the coil of the actuator 70a is energized to move the leading blade 20A away from the opening 11, the coil is energized in the opposite direction. Therefore, before the exposure operation, the drive pin 43a of the drive lever 40a temporally moves away from the buffering member 51a, and then abuts therewith again. After that, the actuators 70a and 70b starts in the exposure operation. Also as for the focal plane shutter 1 according to the second embodiment, the variation in the exposure period can be suppressed. This can suppress the variation in the image quality.

FIG. 9 is a view of the image pickup element 400 on the front view of the focal plane shutter 1 according to the second embodiment in the initial state. The image pickup element 400 is slightly smaller than the opening 11. For this reason, even in a state where the opening 11 is partially opened by moving the blade 21a of the leading blade 20A, when the whole of the leading blade 201 covers the image pickup element 400, the light does not enter the image pickup element 400. Thus, in the second embodiment, the driving amount of the actuator 70a before the exposure operation is set in such a range that the leading blade 201 is capable of blocking the light entering the image pickup element 400. Thus, even when the driving of the actuator 70a causes the leading blade 20A to partially open the opening 11 before the exposure operation, the light does not nave only to enter the image pickup element 400. Additionally, in FIG. 8, a size of the image pickup element 400 is illustrated instead of a size of the opening 11.

Figure 8:
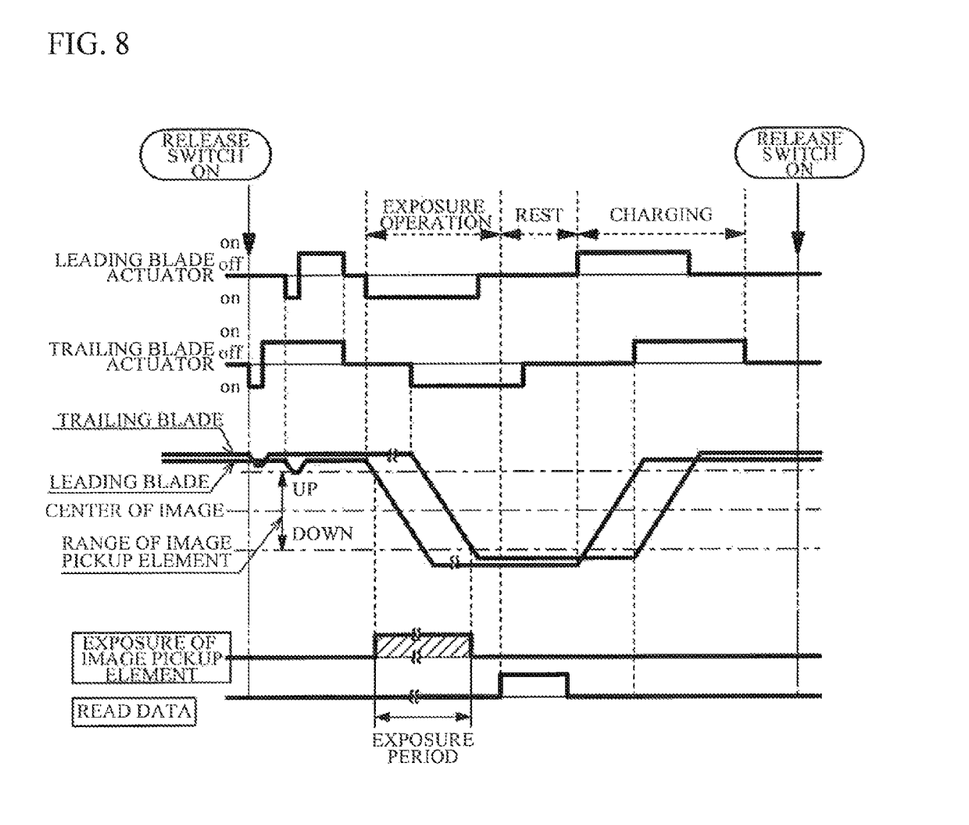
FIG. 8 is a timing chart of the focal plane shutter according to the second embodiment.

Also, as illustrated in FIG. 8, the driving timings of the actuators 70a and 70b are different from each other before the exposure operation. This reduces the load on the control portion 300a. Further, the actuators 70a and 70b may drive at the same time.

Furthermore, the control portion 300a performs the above operation, when the camera is turned on. For example, in a case where the camera is kept turned off for a long time, the drive pins 43a and 43b are maintained for a long time in respective abutment with the buffering members 51a and 51b as illustrated in FIG. 9. For this reason, the exposure period might be varied in shooting right after the turning on. In the present embodiment, even when the camera is turned on, the actuators 70a and 70b are driven to cause the drive pins 43a and 43b to move away from the buffering members 51a and 51b, respectively. It is therefore possible to suppress the variation in the exposure period when the shooting is performed afterward.

Further, the control portion 300a performs the above operation before the exposure operation, when the lens unit L is detached from the camera. After the lens unit L is detached from the camera, the shooting is not performed typically. The above operation is performed in this period, thereby suppressing the variation in the exposure period in shooting. In addition, when it is detected that the lens unit L is attached to the camera, the above operation may be performed.

Additionally, as for the operation performed in turning on the camera or in detaching the lens unit L from the camera, the driving amounts of the actuators 70a and 70b may be set in such a range that the leading blade 20A and the trailing blade 20B influence the image pickup element 400. In this case, the exposure operation is not performed after this operation. Thus, even if this operation causes the image pickup element 400 to receive the light to make data, the data has only to be erased.

Also, as illustrated in FIG. 8, after the control portion 300a energizes the coils of the actuators 70a and 70b in the predetermined direction so that the drive pins 43a and 43b move away from the respective buffering members 51a and 51b, the coils are energized in the opposite direction. However, the present invention is not limited to this arrangement. The control portion 300a may not energize the coils of the actuators 70a and 70b in the opposite direction, and the detent torques of the rotors 71a and 71b may permit the drive pins 43a and 43b to return to the original positions, respectively.

The above description has been given of the case where the drive pins 43a and 43b are maintained in abutment with the respective buffering members 51a and 51b for a certain period. However, the buffering members 51a and 51b may be not provided. In other words, the focal plane shutter according to the present embodiment has the same effect. In a case where the drive pins 43a and 43b respectively abut with the end portions of the escape slots 13a and 13b serving as a part of the board 10 in the state where the leading blade 20A closes the opening 11 and the trailing blade 20B recedes from the opening 11.

While the exemplary embodiments of the present invention have been illustrated in detail, the present invention is not limited to the above-mentioned embodiments, and other embodiments, variations and modifications may be made without departing from the scope of the present invention.

The focal plane shutter according to the present embodiment is applicable to optical apparatuses such as still cameras, and digital cameras.

Also, the above embodiment has described the blades and the arms which are thin and made of a synthetic resin. However, they may have thin plate shapes made of metal. In the above embodiment, each of the leading blade and the trailing blade each includes four blades, but is not limited to this. Each of the leading blade and the trailing blade may include from two to five blades.

Further, the above embodiment has described the case where the drive pin 43b of the drive lever 40b abuts with the one end 13b1 of the escape slot 13b of the board 10 in the state where the trailing blade 20B recedes from the opening 11. However, the present invention is not limited to this case. The drive lever has only to abut with a part of the board 10 different from the one end 13b1 of the escape slot 13b. The drive pin 43a also has the same configuration.

Only in the second embodiment of the above embodiments, the description has been given of the case where driving of the actuators 70a and 70b respectively permit the drive pins 43a and 43b to move away from the buffering members 51a and 51b in turning on the camera or detaching the lens unit. However, the present invention is not limited to this case. In other words, in the block diagram of the camera in the first embodiment illustrated in FIG. 2, there may be provided a power switch for turning on the camera, a lens unit mounted on the camera, and a lens detection portion for detecting the attachment and the detachment of the lens unit to and from the camera. In this case, when the camera is turned on or when the lens unit is attached or detached, the trailing blade actuator 70b may cause the drive pin 43b to move away from the buffering member 51b or the one end 13b1 of the escape slot 13b.

Finally, several aspects of the present invention are summarized as follows.

According to an aspect of the present invention, there is provided a focal plane shutter including: a board including an opening; a leading blade and a trailing blade opening and closing the opening; a trailing blade actuator driving the trailing blade; a drive member driving the trailing blade by receiving driving force of the trailing blade actuator; and a buffering member abutting with the drive member in a state where the trailing blade recedes away from the opening, wherein the trailing blade actuator causes the drive member to move away from the buffering member from an abutting state therewith and to abut therewith again in a charging operation, and then starts an exposure operation.

In such a way, the drive member is temporally moved away from the buffering member in the charging operation, the drive member can stop at a desired position, and the timing when the drive member is moved away from the buffering member can be prevented from being delayed. This can suppress the variation in the exposure period.

According to another aspect of the present invention, there is provided a focal plane shutter including: a board including an opening; a leading blade and a trailing blade opening and closing the opening; a trailing blade actuator driving the trailing blade; and a drive member driving the trailing blade by receiving driving force of the trailing blade actuator; wherein the drive member abuts with a portion of the board in a state where the trailing blade recedes away from the opening, and the trailing blade actuator causes the drive member to move away from the portion of the board from an abutting state therewith and to abut therewith again in a charging operation, and then starts an exposure operation.

In such a way, the drive member is temporally moved away from the part of the board in the charging operation, so the timing when the drive member is moved away from the part of the board can be prevented from being delayed. This can suppress the variation in the exposure period.

According to another aspect of the present invention, there is provided an optical apparatus having the above focal plane shutter.

What is claimed is:
1. A focal plane shutter, comprising:
   a board including an opening;
   a leading blade and a trailing blade opening and closing the opening;
   a trailing blade actuator driving the trailing blade;

a drive member driving the trailing blade by receiving driving force of the trailing blade actuator; and
a buffering member abutting with the drive member in a state where the trailing blade
recedes away from the opening,
wherein, in a charging operation, the trailing blade actuator causes the drive member to move away from the buffering member from an abutting state therewith and to abut therewith again, and then starts an exposure operation.

2. The focal plane shutter of claim 1,
wherein the drive member is moved away from the buffering member from the abutting state therewith by energizing a coil of the trailing blade actuator in a predetermined direction, and
the drive member is abutted with the buffering member again by energizing the coil in an opposite direction to the predetermined direction.

3. The focal plane shutter of claim 1, wherein
the drive member is moved away from the buffering member from the abutting state therewith by energizing a coil of the trailing blade actuator in a predetermined direction, and
a rotor of the trailing blade actuator is rotated by stopping energization of the coil such that the drive member is abutted with the buffering member again.

4. The focal plane shutter of claim 1, comprising a leading blade actuator driving the leading blade,
wherein a timing when energization of the leading blade actuator is started in the charging operation is different from a timing when energization of the trailing blade actuator is started in the charging operation.

5. The focal plane shutter of claim 1, wherein the trailing blade actuator causes the drive member to move away from the buffering member from the abutting state therewith and to abut therewith again, when an apparatus including the focal plane shutter is turned on.

6. The focal plane shutter of claim 1, wherein the trailing blade actuator causes the drive member to move away from the buffering member from the abutting state therewith and to abut therewith again, when a lens is attached to or detached from an apparatus including the focal plane shutter.

7. A focal plane shutter, comprising:
a board including an opening;
a leading blade and a trailing blade opening and closing the opening;
a trailing blade actuator driving the trailing blade; and
a drive member driving the trailing blade by receiving driving force of the trailing blade actuator;
wherein the drive member abuts with a portion of the board in a state where the trailing blade recedes away from the opening, and
wherein, in a charging operation, the trailing blade actuator causes the drive member to move away from the portion of the board from an abutting state therewith and to abut therewith again, and then starts an exposure operation.

8. The focal plane shutter of claim 7, wherein
the drive member is moved away from the portion of the board from the abutting state therewith by energizing a coil of the trailing blade actuator in a predetermined direction, and
the drive member is abutted with the portion of the board again by energizing the coil in an opposite direction to the predetermined direction.

9. The focal plane shutter of claim 7, wherein
the drive member is moved away from the portion of the board from an abutting state therewith by energizing a coil of the trailing blade actuator in a predetermined direction, and
a rotor of the trailing blade actuator is rotated by stopping energization of the coil such that the drive member is abutted with the portion of the board again.

10. A focal plane shutter, comprising:
a board including an opening;
a leading blade and a trailing blade opening and closing the opening;
a leading blade actuator driving the leading blade;
a drive member driving the leading blade by receiving driving force of the leading blade actuator; and
a buffering member abutting with the drive member in a state where the leading blade closes the opening,
wherein, after a release button is pushed, before the leading blade opens the opening, the leading blade actuator causes the drive member to move away from an abutting state therewith and to abut the buffering member again, and then starts an exposure operation.

11. The focal plane shutter of claim 10, further comprising:
a trailing blade actuator driving the trailing blade;
a trailing blade drive member driving the trailing blade by receiving driving force of the trailing blade actuator; and
a trailing blade buffering member abutting with the trailing blade drive member in a state where the trailing blade recedes away with the opening, wherein the trailing blade actuator causes the trailing blade drive member to move away from the trailing blade buffering member from an abutting state therewith and to abut therewith again, and then starts the exposure operation.

12. The focal plane shutter of claim 10, wherein the leading blade actuator causes the drive member to move away from the buffering member from the abutting state therewith and to abut therewith again, in a state where the leading blade prevents light from entering an image pickup element changing an object image formed by light passing through the opening into electric signals.

13. The focal plane shutter of claim 10, wherein the leading blade actuator causes the drive member to move away from the buffering member from the abutting state therewith and to abut therewith again, when an apparatus including the focal plane shutter is turned on.

14. The focal plane shutter of claim 10, wherein the leading blade actuator causes the drive member to move away from the buffering member from the abutting state therewith and to abut therewith again, when a lens is attached to or detached from an apparatus including the focal plane shutter.

15. A focal plane shutter, comprising:
a board including an opening;
a leading blade and a trailing blade opening and closing the opening;
a leading blade actuator driving the leading blade; and
a drive member driving the lead blade by receiving driving force of the leading blade actuator,
wherein the drive member abuts with a portion of the board in a state where the leading blade closes the opening, and
wherein, after a release button is pushed, before the leading blade opens the opening, the leading blade actuator causes the drive member to move away from the portion of the board from an abutting state therewith and to abut therewith again, and then starts an exposure operation.

16. The focal plane shutter of claim 15, wherein the leading blade actuator causes the drive member to move away from the portion of the board from the abutting state therewith and to abut therewith again, in a state where the leading blade prevents light from entering an image pickup element changing an object image formed by light passing through the opening into electric signals.

17. The focal plane shutter of claim 15, wherein the leading blade actuator causes the drive member to move away from the board from the abutting state therewith and to abut therewith again, when an apparatus including the focal plane shutter is turned on.

18. The focal plane shutter of claim 15, wherein the leading blade actuator causes the drive member to move away from the board from the abutting state therewith and to abut therewith again, when a lens is attached to or detached from an apparatus including the focal plane shutter.

19. A focal plane shutter, comprising:
a board including an opening;
a leading blade and a trailing blade opening and closing the opening;
a trailing blade actuator driving the trailing blade; and
a drive member driving the trailing blade by receiving driving force of the trailing blade actuator,
wherein the drive member abuts with a portion of the board in a state where the trailing blade recedes away from the opening, and
wherein, after a release button is pushed, before the trailing blade closes the opening, the trailing blade actuator causes the drive member to move away from the portion of the board from an abutting state therewith and to abut therewith again, and then starts an exposure operation.

20. An optical apparatus comprising a focal plane shutter, comprising:
a board including an opening;
a leading blade and a trailing blade opening and closing the opening;
a trailing blade actuator driving the trailing blade;
a drive member driving the trailing blade by receiving driving force of the trailing blade actuator; and
a buffering member abutting with the drive member in a state where the trailing blade recedes away from the opening,
wherein, after a release button is pushed, before the trailing blade closes the opening, the trailing blade actuator causes the drive member to move away from the buffering member from an abutting state therewith and to abut therewith again in a charging operation, and then starts an exposure operation.

* * * * *